(12) United States Patent
Wu et al.

(10) Patent No.: US 12,229,065 B2
(45) Date of Patent: Feb. 18, 2025

(54) DATA FLOW CONTROL MODULE FOR AUTONOMOUS FLOW CONTROL OF MULTIPLE DMA ENGINES

(71) Applicant: Cryptography Research, Inc., San Jose, CA (US)

(72) Inventors: Winthrop John Wu, Pleasanton, CA (US); Samatha Gummalla, Dublin, CA (US); Bryan Jason Wang, South Lake Tahoe, CA (US)

(73) Assignee: Cryptography Research, Inc., San Jose, CA (US)

( * ) Notice: Subject to any disclaimer, the term of this patent is extended or adjusted under 35 U.S.C. 154(b) by 104 days.

(21) Appl. No.: 18/063,959

(22) Filed: Dec. 9, 2022

(65) Prior Publication Data

US 2023/0185745 A1    Jun. 15, 2023

Related U.S. Application Data

(60) Provisional application No. 63/289,101, filed on Dec. 13, 2021.

(51) Int. Cl.
*G06F 13/28* (2006.01)

(52) U.S. Cl.
CPC .................................. *G06F 13/28* (2013.01)

(58) Field of Classification Search
CPC ..................................................... G06F 13/28
USPC ......................................................... 710/22
See application file for complete search history.

(56) References Cited

U.S. PATENT DOCUMENTS

| | | | | |
|---|---|---|---|---|
| 6,247,084 B1* | 6/2001 | Apostol, Jr. | ........ | G06F 13/1684 711/149 |
| 7,155,541 B2 | 12/2006 | Ganapathy et al. | | |
| 8,218,538 B1* | 7/2012 | Chidambaram | .... | H04L 49/9094 370/386 |
| 8,326,938 B1* | 12/2012 | Chiang | ................ | H01M 4/925 709/212 |
| 2005/0223131 A1* | 10/2005 | Goekjian | ................ | G06F 13/28 710/22 |

(Continued)

OTHER PUBLICATIONS

Intel, "Multi Channel DMA Intel FPGA IP for PCI Express User Guide", Intel, UG-20297, Aug. 16, 2021, Downloaded on Oct. 8, 2021 at: https://www.intel.com/content/www/us/en/programmable/documentation/xzr1589413426034.html#mnt1592439517017, 114 pages.

*Primary Examiner* — Titus Wong
(74) *Attorney, Agent, or Firm* — AMSEL IP LAW PLLC; Jason Amsel

(57) ABSTRACT

A DMA system includes two or more DMA engines that facilitate transfers of data through a shared memory. The DMA engines may operate independently of each other and with different throughputs. A data flow control module controls data flow through the shared memory by tracking status information of data blocks in the shared memory. The data flow control module updates the status information in response to read and write operations to indicate whether each block includes valid data that has not yet been read or if the block has been read and is available for writing. The data flow control module shares the status information with the DMA engines via a side-channel interface to enable the DMA engines to determine which block to write to or read from.

20 Claims, 6 Drawing Sheets

(56) References Cited

U.S. PATENT DOCUMENTS

| | | | |
|---|---|---|---|
| 2007/0204073 A1* | 8/2007 | Chen | G06F 13/28 |
| | | | 710/22 |
| 2008/0209084 A1* | 8/2008 | Wang | G06F 13/28 |
| | | | 710/22 |
| 2017/0277633 A1* | 9/2017 | Wilkerson | G06F 12/1009 |
| 2018/0367516 A1* | 12/2018 | Mundra | H04L 9/3239 |
| 2020/0145020 A1* | 5/2020 | Goyal | H03M 7/6011 |

* cited by examiner

DATA FLOW CONTROL MODULE FOR AUTONOMOUS FLOW CONTROL OF MULTIPLE DMA ENGINES

CROSS-REFERENCE TO RELATED APPLICATIONS

This application claims the benefit of U.S. Provisional Application No. 63/289,101 filed on Dec. 13, 2021, which is incorporated by reference herein.

BACKGROUND

Direct memory access (DMA) engines move data autonomously between memories. Once a DMA transfer is initiated, the transfer can occur substantially independently from a host processor, thereby enabling the host processor to concurrently perform other operations.

BRIEF DESCRIPTION OF THE DRAWINGS

The teachings of the embodiments herein can be readily understood by considering the following detailed description in conjunction with the accompanying drawings.

DETAILED DESCRIPTION

A DMA system includes two or more DMA engines that facilitate transfers of data through a shared memory. The DMA engines may operate independently of each other and with different throughputs. A data flow control module controls data flow through the shared memory by tracking status information of data blocks in the shared memory. The data flow control module updates the status information in response to read and write operations to indicate whether each block includes valid data that has not yet been read or if the block has been read and is available for writing. The data flow control module shares the status information with the DMA engines via a side-channel interface to enable the DMA engines to determine which block to write to or read from.

Figure 1:
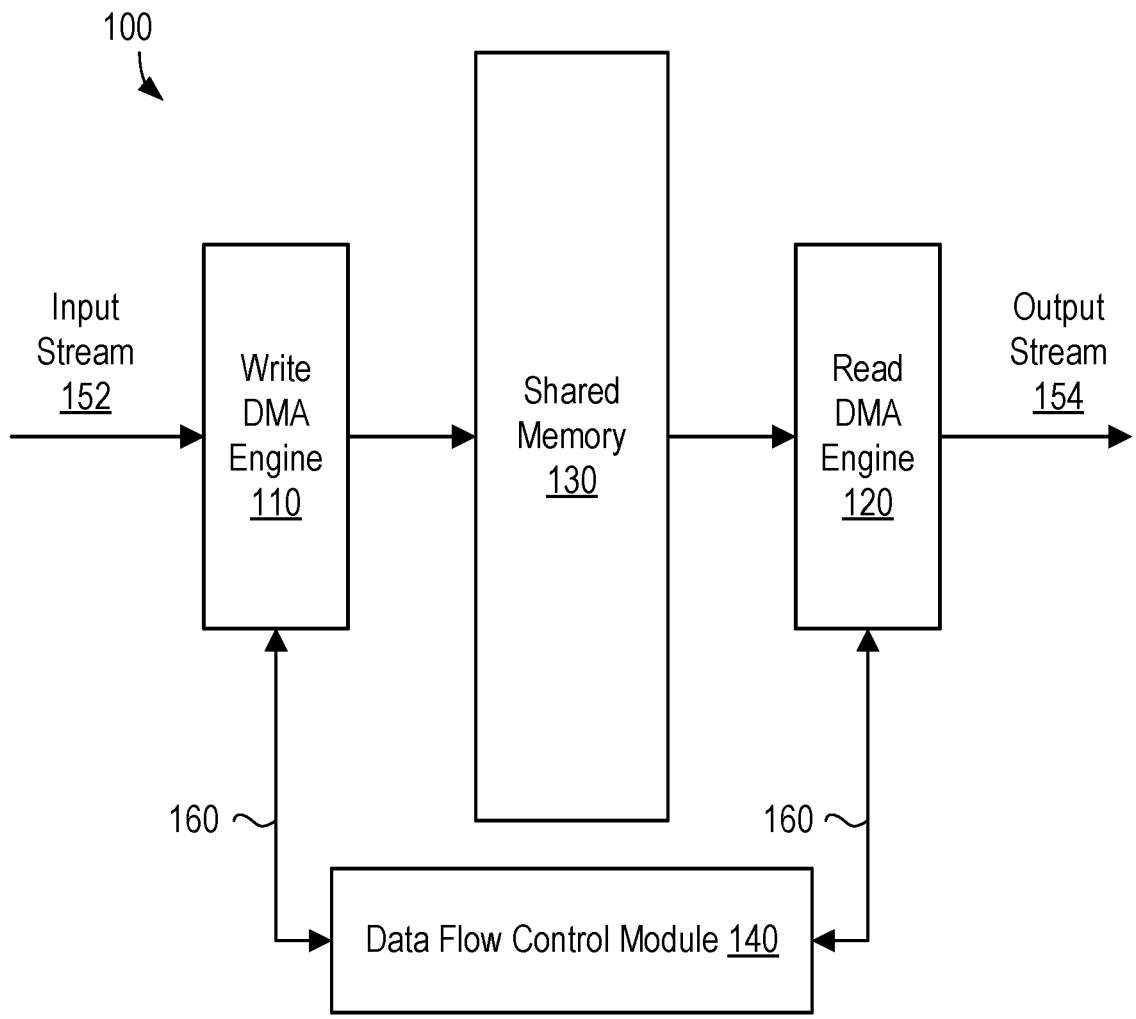
FIG. 1 is a first example embodiment of a DMA system.

FIG. 1 is an example embodiment of a DMA system 100 in which multiple DMA engines 110, 120 access a shared memory 130. The DMA engines 110, 120 include special-purpose logic for performing memory operations (e.g., such as read and write operations) independently of an external host processor (not shown). Thus, the DMA engines 110, 120 can facilitate reading of the input stream 152 (e.g., from an external memory) and writing of the output stream 154 (e.g., to an external memory) without consuming processing resources of an external host processor once the transfer is initiated. The DMA engines 110, 120 may include an external control interface (not shown) to receive commands for initiating a transfer of a set of data blocks and for the DMA engines 110, 120 to signal completion of the transfer. Examples of computing systems that incorporate a DMA system 100 are described in further detail below with respect to FIGS. 5-6.

The illustrated embodiment includes a write DMA engine 110 and a read DMA engine 120. The write DMA engine 110 facilitates writing of an input stream 152 (comprising a sequence of data blocks) to the shared memory 130 via DMA operations. The read DMA engine 120 reads from the shared memory 130 via DMA operations to generate an output stream 154. The read DMA engine 120 may be configured to read the same data blocks written to the shared memory by the write DMA engine 110. In FIG. 1, the distinction between the write DMA engine 110 and the read DMA engine 120 is based on their respective functions with respect to the input stream 152 and output stream 154. In some embodiments, the write DMA engine 110 and the read DMA engine 120 may comprise identical DMA engines that are each capable of performing both read and write operations with respect to different data streams. For example, the same DMA engine may switch between performing read and write operations or may perform read and write operations concurrently with respect to different data streams.

The data flow control module 140 tracks a state of a set of memory blocks in the shared memory 130 to indicate whether each block is "valid" or "empty." Here, a "valid" state of a block indicates that the block contains data written from the write DMA engine 110 that has not yet been read by the read DMA engine 120. In contrast, an "empty" state of a block indicates that the data has already been read by the read DMA engine 120 and can therefore be overwritten without data loss. The data flow control module 140 communicates with the write DMA engine 110 and the read DMA engine 120 via respective side channels 160 to update the state of a block after each write and read operation. For example, the data flow control module 140 changes the state of a block to valid following the write DMA engine 110 writing to the block and changes the state of the block to empty following the read DMA engine 120 reading from the block. The data flow control module 140 also reports the block states to the write DMA engine 110 and the read DMA engine 120 via the respective side channels 160. The data flow control module 140 may report the states after each state change or in response to a query from the write DMA engine 110 or the read DMA engine 120.

The write DMA engine 110 and read DMA engine 120 determine which blocks in the shared memory 130 to write to and read from based on the block states obtained from the data flow control module 140. For example, when the write DMA engine 110 receives a new data block in the input stream 152, it selects an empty block, writes the new data block to the empty block, and sends an update to the data flow control module 140 to cause the block state to be updated to a valid state. The read DMA engine 120 detects when a valid block is available in the shared memory 130 based on the status information from the data flow control module 140, reads the valid block into the output stream 154, and then send an update to the data flow control module 140 to cause the block state to be updated to an empty state. Updates between the data flow control module 140 and the DMA engines 110, 120 may occur after each individual state change of a block, or a batch update may occur after state changes for a set of blocks. For example, the write DMA engine 110 may write a set of blocks to the shared memory 130 and then provide a single update to the data flow control module 140.

In the described embodiment, the input stream 152 and the output stream 154 may have different data rates. Furthermore, the write DMA engine 110 and the read DMA engine 120 may operate with different throughputs. The write DMA engine 110 and the read DMA engine 120 may operate asynchronously and independently of each other apart from the shared state information managed by the data flow control module 140.

In an embodiment, the shared memory 130 may comprise one more ring buffers for storing data blocks. Here, the data flow control module 140 may track the block states of a ring buffer using FIFO-like read and write pointers. During write operations, the write DMA engine 110 writes to a block of the ring buffer indicated by the current write pointer. The write DMA engine 110 then issues a push signal to the data flow control module 140 that indicates that it is writing (validating) the block of data associated with the current write pointer and the write pointer is then circularly incremented. Independently, during read operations, the read DMA engine 120 reads from a block of the ring buffer indicated by the current read pointer. The read DMA engine 120 then issues a pop signal to the data flow control module 140 indicating that it is reading (emptying) a block of data from the current read pointer and the read pointer is then circularly incremented. The current read and write pointers can be communicated to the write DMA engine 110 and the read DMA engine 120 after each update to track the state of each block in the ring buffer. For example, the set of data blocks from the read pointer to the write pointer in the incrementing direction (i.e., data blocks that have been written to but have not yet been read) are valid data blocks while the set of data blocks from the write pointer to the read pointer in the incrementing direction (i.e., data blocks that have been read and have not yet been re-written to) represent empty data blocks.

In another embodiment, the data flow control module 140 tracks the block states of a ring buffer or other buffer as a bit vector with each bit corresponding to a block of the shared memory and indicating its state (e.g., 0=empty, 1=valid, or vice versa). Here, the write DMA engine 110 may determine which block to write to by circularly incrementing a write pointer until it finds an empty block. Similarly, the read DMA engine 120 may determine which block to read from by circularly incrementing a read pointer until it finds a valid block. In other embodiments, block selection logic in the write DMA engine 110 and the read DMA engine 120 may determine which block to write to or read from respectively based on a different protocol that does not necessarily utilize write and read pointers. In yet further embodiments, external control signals (e.g., from a host processor) may determine how the write DMA engine 110 selects which empty block it writes to for a given input block of the input stream 152 and how the read DMA engine 120 prioritizes reads from different valid blocks to generate the output stream 154.

The shared memory 130 may include a single buffer or may include multiple different buffers. If the shared memory 130 includes multiple different buffers, the data flow control module 140 may independently track the block states for each buffer using any of the techniques described above.

The write DMA engine 110 may facilitate transfer of multiple independent input streams 152 and the read DMA engine 120 may facilitate transfer of multiple independent output streams 154. Each stream can map to a single buffer in a one-to-one manner, multiple different input or output streams can share the same buffer, or a single stream can switch between multiple different buffers. In an embodiment, the data flow control module 140 may control a dynamic mapping of different data streams to different buffers in the shared memory 130. For example, the data flow control module 140 may assign the write DMA engine 110 to write the input stream 152 to a first buffer in the shared memory 130 for a first time period, and then may switch the assignment of the input stream 152 to a second buffer during a second time period. Similarly, the data flow control module 140 may assign the read DMA engine 120 to read the output stream 154 from a first buffer in the shared memory 130 for a first time period, and then may switch the assignment of the output stream 154 to a second buffer during a second time period.

The data flow control module 140 can also dynamically allocate the size of the buffers and the locations of the buffers in the shared memory 130. Here, the allocation may be based on signals received from an external processor (not shown) or may be based on characteristics of the input stream 152 and output stream 154.

In an embodiment, the data flow control module 140 may be accessed by an external processor (not shown) outside the DMA engines 110, 120. Here, the external processor may obtain the state information tracked by the data flow control module 140 to facilitate control of the DMA engines 110, 120 or to control other operations of a host system.

Figure 2:
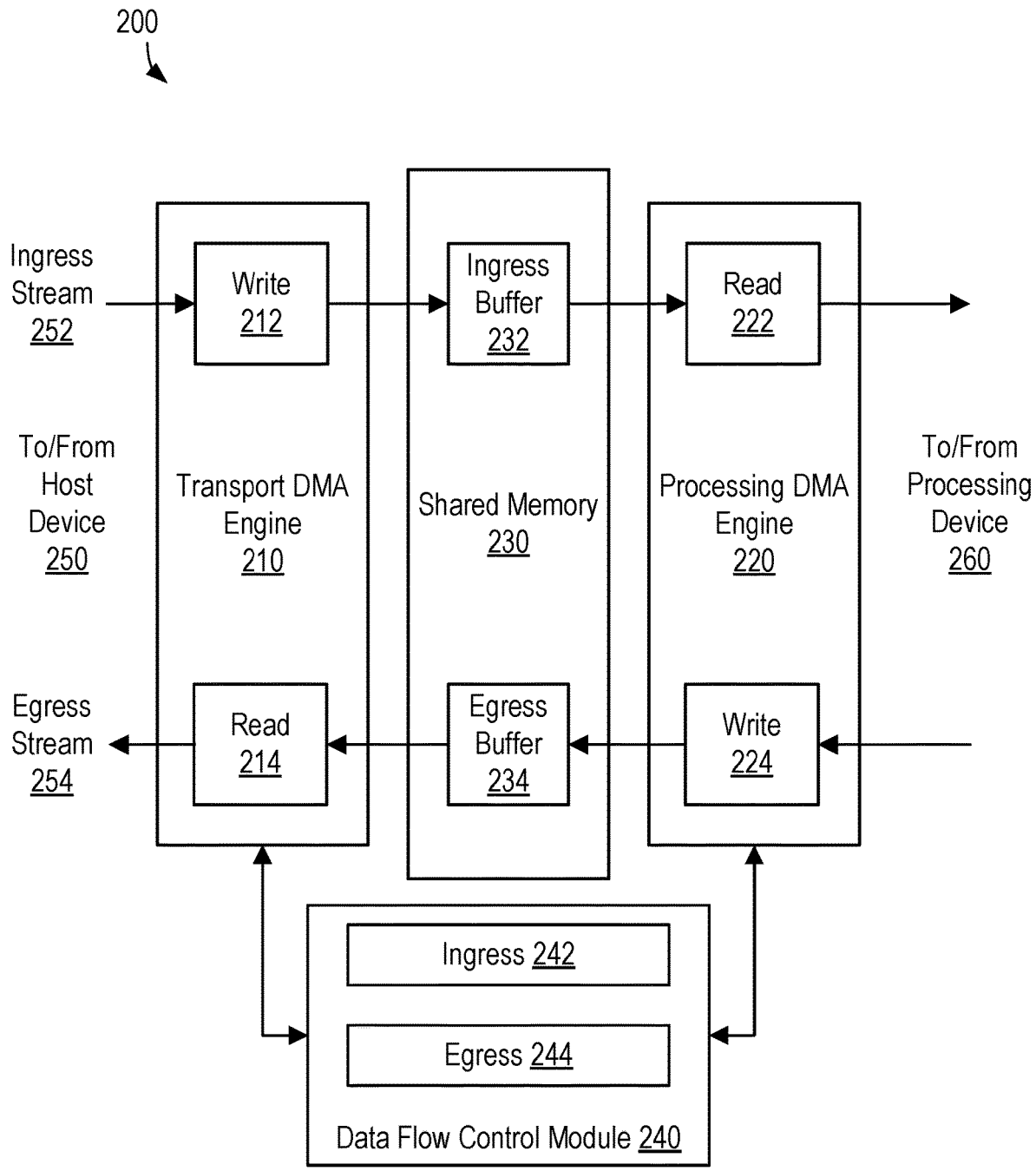
FIG. 2 is a second example embodiment of a DMA system.

FIG. 2 illustrates another example embodiment of a DMA system 200 in which multiple DMA engines 210, 220 access a shared memory 230. In this embodiment, a transport DMA engine 210 performs DMA transfers between a host device 250 and a shared memory 230 and a processing DMA engine 220 performs transfers between a processing device 260 and the shared memory 230. In operation, the host device 250 provides an ingress stream 252 that is transferred through the DMA engines 210, 220 and shared memory 230 to a processing device 260. The processing device 260 transforms the ingress stream 252 to generate an egress stream 254, which is transferred back through the DMA engines 210, 220 and shared memory 230 to the host device 250. In an example application, the processing device 260 may comprise a cryptography engine for encrypting or decrypting the ingress stream 252 to generate the egress stream 254. In other embodiments, the processing device 260 may perform a different transformation to generate the egress stream 254 from the ingress stream 252. In further embodiments, the egress stream 254 is not necessarily derived from the ingress stream 252. For example, the ingress stream 252 and egress stream 254 may instead be independent data streams undergoing unidirectional transfers from the host device 250 to the processing device 260 or vice versa.

In the illustrated example embodiment, the shared memory 230 includes a separate ingress buffer 232 associated with the ingress stream 252 and an egress buffer 234 associated with the egress stream 254. In an ingress data path, a write DMA engine 212 of the transport DMA engine 210 writes blocks of the ingress stream 252 to the ingress buffer 232 and a read DMA engine 222 of the processing DMA engine 220 reads blocks of the ingress stream 252 from the ingress buffer 232. Similarly, in an egress data path, a write DMA engine 224 of the processing DMA engine 220 writes blocks of the egress stream 254 to the egress buffer 234 and a read DMA engine 214 of the transport DMA engine 210 reads blocks of the egress stream 254 from the egress buffer 234.

The data flow control module 240 maintains the states of the data blocks of the ingress buffer 232 in an ingress buffer state register 242 and maintains the states of the data blocks of the egress buffer 234 in an egress buffer state register 244. In the same manner described above, the data flow control module 240 updates the states in the respective registers 242, 244 in response to read and write operations performed by the respective DMA engines 210, 220 and communicates the states to the respective DMA engines 210, 220 to enable them to determine which blocks are empty and may be written to and which blocks have valid data for reading.

Figure 3:
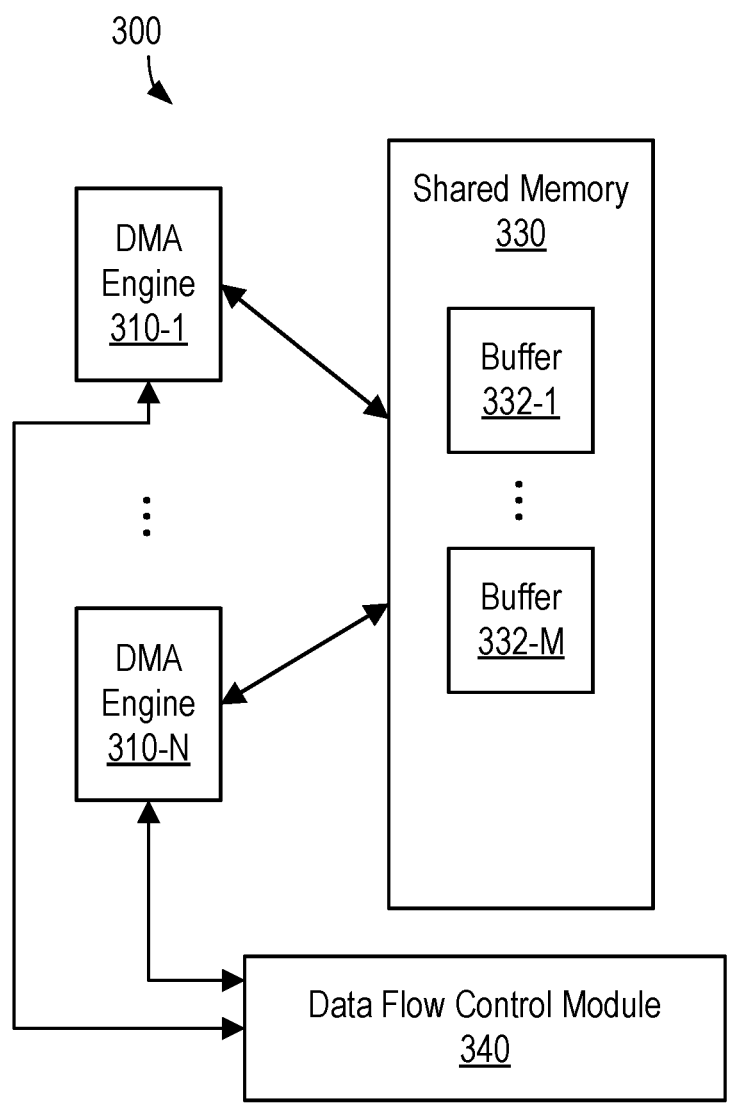
FIG. 3 is a third example embodiment of a DMA system.

FIG. 3 illustrates another embodiment of a DMA system 300. This embodiment includes a set of N DMA engines 310 (where N is an integer ≥1), a shared memory 330 having a set of M buffers (where M is an integer ≥1), and a data flow control module 340 for maintaining the block states of each of the M buffers 332. The DMA engines 310 can each perform write operations to a specified buffer 332, read operations from a specified buffer 332, or both. Here, the data flow control module 340 can dynamically control assignment of DMA engines 310 to buffers 332. The data flow control module 340 furthermore communicates with the DMA engines 310 to track the states of the blocks in each buffer 332 and to provide the state information to the DMA engines 310.

Figure 4:
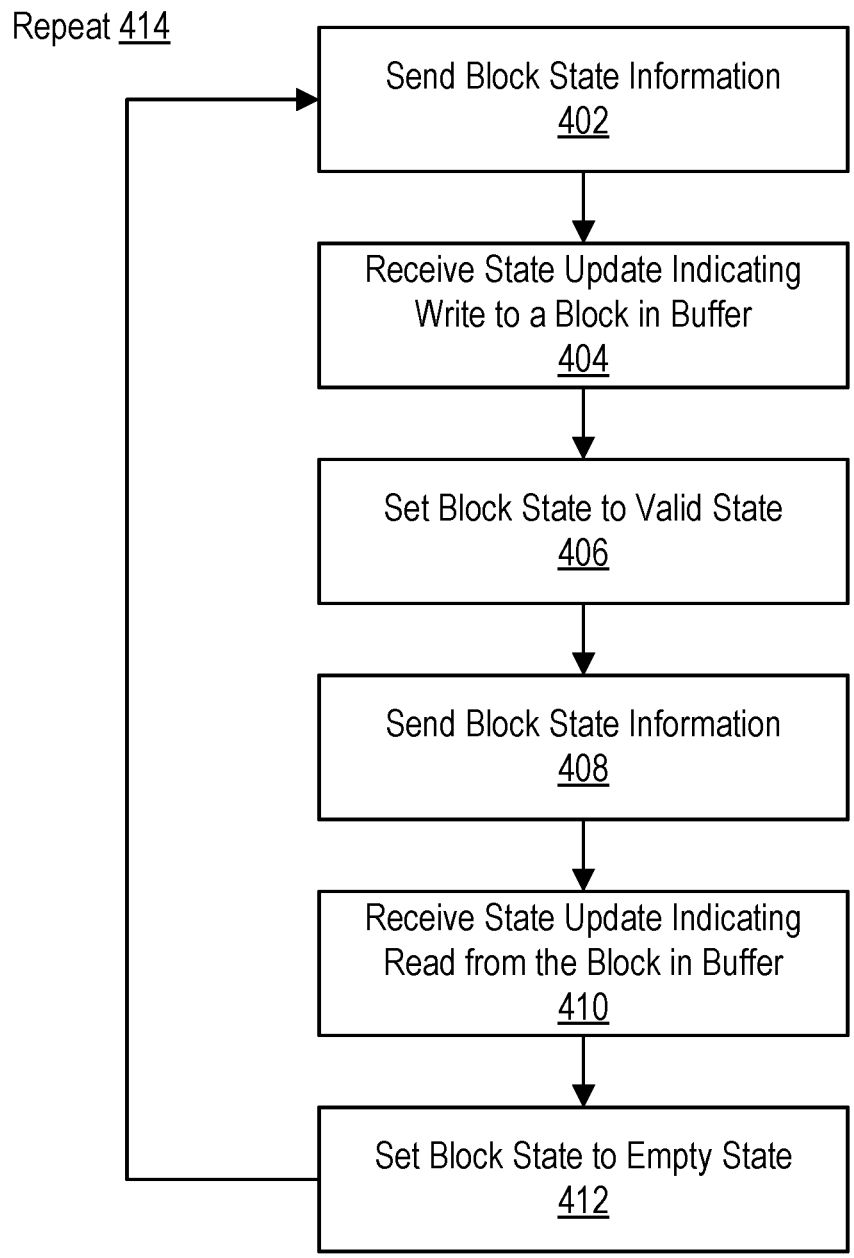
FIG. 4 is a flowchart illustrating an example embodiment of a process for operating a data flow control module of a DMA system.

FIG. 4 illustrates an example embodiment of a process performed by a data flow control module 340 for tracking state of a specified data block of a shared memory 330. The data flow control module 340 sends 402 state information to the DMA engines 310 indicating a state of the data block in the shared memory 330. For example, the state information may initially indicate that the block is empty and available for writing. Following a write operation to the block, the data flow control module 340 receives 404 a write status update signal indicating that a write operation was performed to the specified block of a buffer 332 in the shared memory 330. In response to the write status update signal, the data flow control module 340 sets 406 the state of specified block to a valid state. The data flow control module 340 sends 408 updated state information to the DMA engines 310 indicating the state update. At a later time, the data flow control module 340 receives 410 a read status update signal indicating that a read operation was performed from the specified block of the buffer 332 in the shared memory 330. The data flow control module sets 412 the state of the specified block to an empty state. The process may repeat 414 through any number of write and read cycles for the specified block.

The same general process may be performed to track each block of a buffer 332 in the shared memory 330. In some embodiments, the steps for sending the block information 402, 408 may provide updates for all blocks concurrently. In other embodiments, the data flow control module 340 may send block information associated with only a single block (e.g., the block that was updated) or a limited set of blocks.

Figure 5:
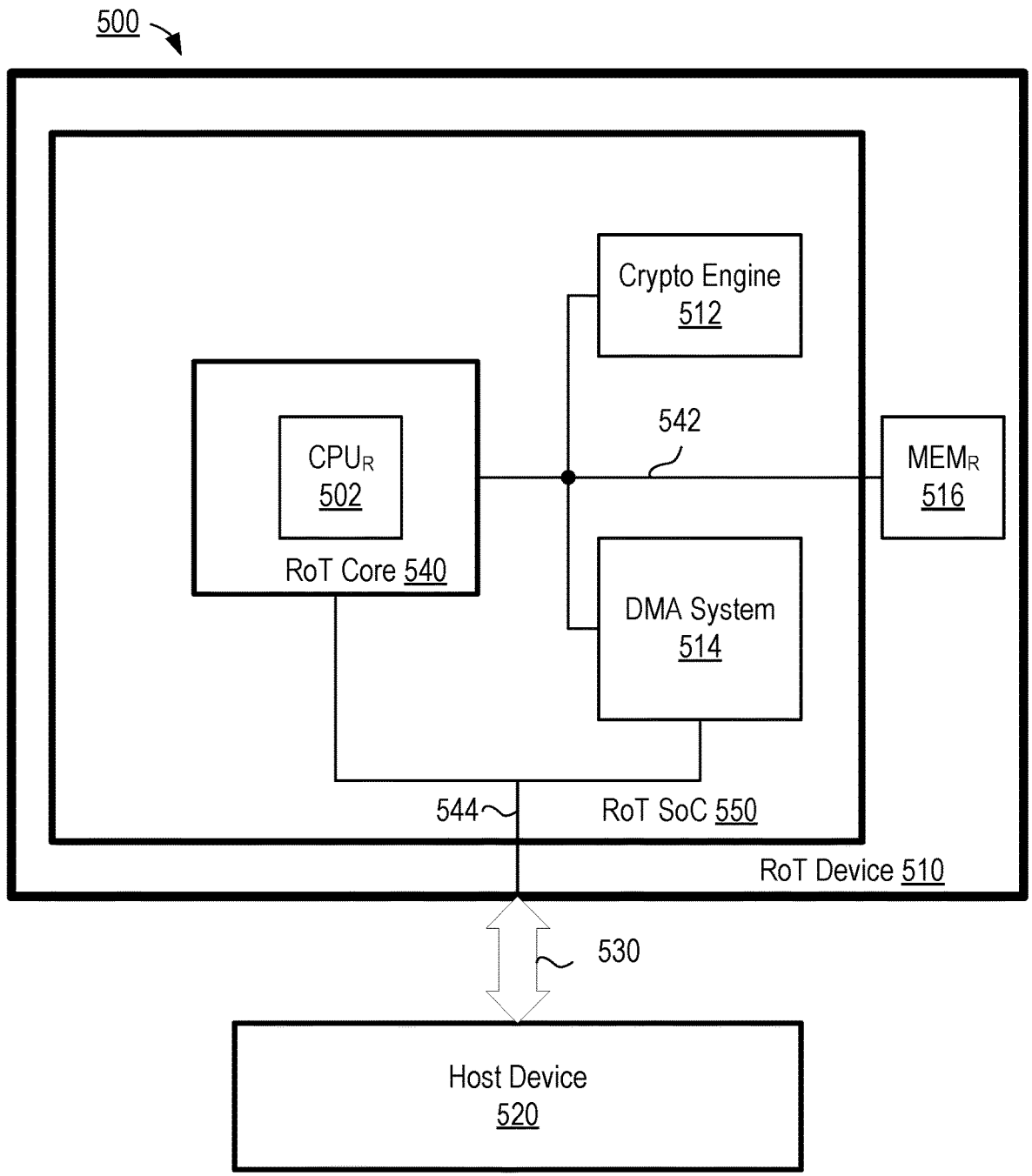
FIG. 5 is an example embodiment of a root of trust (RoT) device for performing encryption and decryption operations that includes a DMA system with autonomous flow control.

FIG. 5 illustrates an example embodiment of a computing system 500 that incorporates a DMA system 514 with autonomous flow control according to the embodiments described above. The computing system 500 comprises a host device 520 and a root of trust (RoT) device 510 coupled by an external bus 530. The external bus 530 may comprise, for example, a peripheral component interconnect express (PCIe) bus or other interconnect bus for transferring data and commands between the host device 520 and the RoT device 510.

The host device 520 may comprise, for example, a workstation, a server, a single-board computer, or other computing device. The host device 520 may store data in encrypted form (i.e., ciphertext data) and/or in unencrypted form (i.e., plaintext data).

The RoT device 510 performs encryption or decryption functions associated with data from the host device 520. For example, the RoT device 510 may receive plaintext data from the host device 510 (via the external bus 530), encrypt the plaintext data to generate ciphertext data, and provide the ciphertext data to the host device 520 via the external bus 530. Furthermore, the RoT device 510 may receive ciphertext data from the host device 520 (via the external bus 530), decrypt the ciphertext data to generate plaintext data, and provide the plaintext data back to the host device 520 via the external bus 530. In other embodiments, the RoT device 510 may perform other transformations on data from the host device 520 that are not necessarily encryption or decryption of the data. Furthermore, in some embodiments, the RoT device 510 may facilitate unidirectional transfers from the host device 520 to the RoT device 510 or vice versa without necessarily performing transformations of the data.

The RoT device 510 comprises an RoT memory ($MEM_R$) 516 and an RoT system-on-chip (SoC) 550. The RoT memory 516 may comprise one or more DRAM devices or other types of memory. The RoT SoC 550 performs encryption and decryption functions on data in the RoT memory 516. The RoT SoC 550 comprises a DMA system 514, a cryptographic engine 512, and an RoT core 540 that includes an RoT processor ($CPU_R$) 502.

The DMA system 514 manages DMA operations of the RoT device 510 based on commands received from the RoT core 540 via an RoT system bus 542. The DMA system 514 may include multiple DMA engines, a shared memory, and a data flow control module that operate according to any of the embodiments described above to transfer data between the host device 520 and the RoT device 510. For example, in one embodiment, the DMA system 514 operates according to the DMA system 200 of FIG. 2, where the host device 510 corresponds to the host device 520 and the RoT Core 540, cryptography engine 512, and RoT memory 516 correspond to the processing device 260. Alternatively, the DMA system 514 may correspond to the DMA system 300 of FIG. 3 to facilitate transfer of multiple data streams from the host device 520 and/or other external devices. In other embodiments where the DMA system 514 is used for unidirectional transfers, the DMA system 514 may correspond to the DMA system 100 of FIG. 1.

The cryptographic engine 512 performs encryption and decryption of data in the RoT memory 516 based on one or more cryptographic keys obtained from the RoT core 540. For example, to perform encryption, the cryptographic engine 512 obtains plaintext data from the RoT memory 516, encrypts the plaintext data to generate ciphertext data based on the one or more cryptographic keys, and writes the ciphertext back to the RoT memory 516. To perform decryption, the cryptographic engine 512 obtains ciphertext data from the RoT memory 516, decrypts the ciphertext data to generate plaintext data based on one or more cryptographic keys, and writes the plaintext data back to the RoT memory 516.

The RoT processor 502 comprises a general-purpose processor or a special-purpose processor for controlling the cryptographic engine 512 and the DMA engine 514. The RoT processor 502 may furthermore perform actions such as generating and/or delivering one or more cryptographic keys to the cryptographic engine 512. In an embodiment, the RoT core 140 is isolated from the rest of the RoT device 510 by an isolated control plane.

In an example embodiment, the RoT device 510 may comprise a printed circuit board that supports the RoT memory 516 and the RoT SoC 550. The RoT SoC 550 may be implemented using a field programmable gate array (FPGA) or may comprise an application-specific integrated circuit (ASIC) device. In other embodiments, one or more components of the RoT SoC 550 may be implemented in software or firmware. For example, functions of the RoT SoC 550 described herein may be implemented based on the RoT processor 502 executing instructions stored to a non-transitory computer-readable storage medium.

Figure 6:
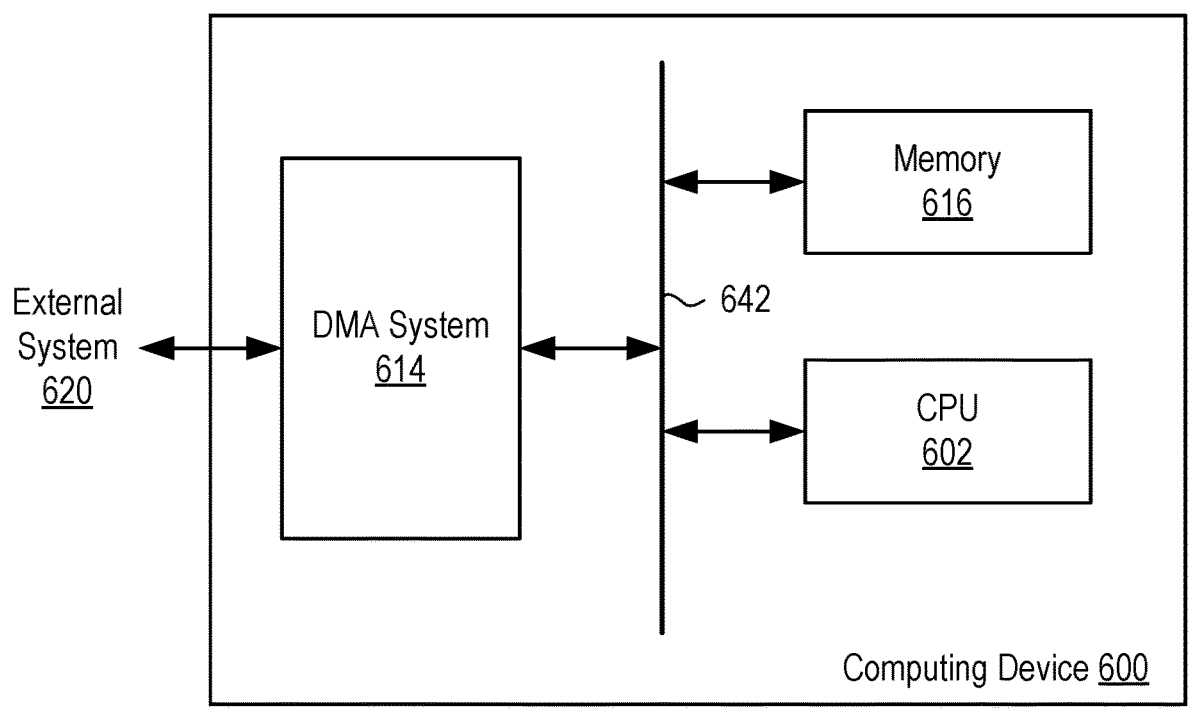
FIG. 6 is an example embodiment of a computer system that includes a DMA system with autonomous flow control.

FIG. 6 illustrates another example embodiment of a computing system 600 that incorporates a DMA system 614 with autonomous flow control according to the embodiments described above. The computing system 600 comprises the DMA system 614, a memory 616, and a processor 602, all coupled by a bus 642.

The processor 602 may comprise a general-purpose processor or a special-purpose processor specifically configured for graphics processing, security function processing, cryptographic processing, or other special-purpose computer functions. The memory 616 may comprise one or more DRAM devices or other types of general or special-purpose memory.

The DMA system 614 manages DMA operations of the computing device 600 based on command received from the processor 602 to transfer data to the memory 616 from an external system and to transfer data from the memory 616 to an external system 620. As described above, the DMA system 614 may include multiple DMA engines, a shared memory, and a data flow control module that operate according to any of the embodiments described above (e.g., in FIGS. 1-3) to perform DMA operations with automated flow control during transfers between the memory 616 and the external system 620.

In the example computer systems 500, 600 of FIGS. 5-6, the DMA systems 514, 614 include logic for accessing the memories 516, 616 and performing memory operations independently of the processors 502, 602. For example, the processor 502, 602 may send a command to the DMA system 514, 614 to initiate a DMA transfer, after which the DMA system 514, 614 independently executes the while the processor 502, 602 may perform other operations in parallel. Upon completing the transfer, the DMA system 514, 614 may assert an interrupt signal to indicate to the processor 502, 602 that the operations are completed.

In various embodiments, the DMA systems 100, 200, 300, 514, 614 described herein may be embodied in one or more standalone integrated circuits or chips such as an application specific integrated circuit (ASIC) or field programmable gate array (FPGA). Furthermore, the DMA systems 100, 200, 300, 514, 614 may be incorporated into one or more integrated circuits or chips that include other components (such as those illustrated in FIGS. 5-6) for performing general purpose computing functions, or special purpose functions such as graphics processing, security (e.g., encryption, decryption, or other cryptographic functions), or other specialized computing functions.

Upon reading this disclosure, those of ordinary skill in the art will appreciate still alternative structural and functional designs and processes for the described embodiments, through the disclosed principles of the present disclosure. Thus, while embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure herein without departing from the scope of the disclosure as defined in the appended claims.

What is claimed is:

1. A direct memory access (DMA) system comprising:
    a shared memory device;
    a first DMA engine to obtain block status information of an ingress buffer of the shared memory device indicating respective states of blocks in the ingress buffer, to identify an empty data block of the ingress buffer of the shared memory device based on the block status information, to write an input data block of an ingress data stream to the empty data block of the ingress buffer, and to generate a write status update signal for the ingress buffer to update a state of the empty data block of the ingress buffer to a valid state;
    a second DMA engine to obtain the block status information of the ingress buffer, to identify a valid data block of the ingress buffer based on the block status information, to read from the valid data block of the ingress buffer to generate an output data block of the ingress data stream, and to generate a read status update signal for the ingress buffer to update a state of the valid data block of the ingress buffer to an empty state; and
    a data flow control device to update data block states represented in the block status information of the ingress buffer in response to the write status update signal for the ingress buffer and the read status update signal for the ingress buffer, and to send the block status information of the ingress buffer to the first DMA engine and the second DMA engine.

2. The DMA system of claim 1,
    wherein the second DMA engine is further configured to obtain block status information of an egress buffer of the shared memory device indicating respective states of blocks in the egress buffer, to identify an empty data block of the egress buffer of the shared memory device based on the block status information of the egress buffer, to write an input data block of an egress data stream to the empty data block of the egress buffer, and to generate a write status update signal for the egress buffer to update a state of the empty data block of the egress buffer to a valid state;
    wherein the first DMA engine is further configured to obtain the block status information of the egress buffer, to identify a valid data block of the egress buffer based on the block status information, to read from the valid data block of the egress buffer to generate an output data block of the egress data stream, and to generate a read status update signal for the egress buffer to update a state of the valid data block of the egress buffer to an empty state; and
    wherein the data flow control device is further configured to update data block states indicated in the block status information of the egress buffer in response to the write status update signal for the egress buffer and the read status update signal for the egress buffer, and to send the block status information of the egress buffer to the first DMA engine and the second DMA engine.

3. The DMA system of claim 2, further comprising:
    a host device to generate the ingress data stream to the first DMA engine and to receive the egress data stream from the first DMA engine; and
    a processing device to receive the ingress data stream from the second DMA engine, to generate the egress data stream based on the ingress data stream, and to provide the egress data stream to the second DMA engine.

4. The DMA system of claim 3, wherein the processing device comprises a cryptography device to perform encryption or decryption of the ingress data stream to generate the egress data stream.

5. The DMA system of claim 1, wherein the data flow control device is further configured to dynamically control a size of the ingress buffer.

6. The DMA system of claim 1, wherein the ingress buffer comprises a ring buffer, and wherein the block status information of the ingress buffer comprises a write pointer circularly incremented after each write operation and a read pointer circularly incremented after each read operation, wherein the first DMA engine is configured to write to the ingress buffer based on the write pointer, and wherein the second DMA engine is read from the ingress buffer based on the read pointer.

7. The DMA system of claim 1, wherein the block status information of the ingress buffer comprises a bit vector with each bit indicating a state of a respective block of the ingress buffer.

8. The DMA system of claim 1, wherein the first and second DMA engines perform read and write operations asynchronously and independently of each other.

9. The DMA system of claim 1, wherein the first and second DMA engine operate with different throughput.

10. A data flow control device for a direct memory access (DMA) system, the data flow control device comprising:
a first side-channel interface to communicate with a first direct memory access (DMA) engine, the first side-channel interface to send block status information identifying an empty data block of an ingress buffer of a shared memory device, and to receive from the first DMA engine, a write status update signal for the ingress buffer to update a state of the empty data block of the ingress buffer to a valid state following a write operation;
a second side-channel interface to communicate with a second DMA engine, the second side-channel interface to send block status information identifying a valid data block of the ingress buffer, and to receive from the second DMA engine, a read status update signal for the ingress buffer to update a state of the valid data block of the ingress buffer to an empty state following a read operation; and
block status tracking logic to update data block states represented in the block status information of the ingress buffer in response to the write status update signal for the ingress buffer and the read status update signal for the ingress buffer.

11. The data flow control device of claim 10,
wherein the block status information sent by the second side-channel interface further identifies an empty data block of an egress buffer of the shared memory device, and wherein the second side-channel interface is further configured to receive from the second DMA engine, a write status update signal for the egress buffer to update a state of the empty data block of the egress buffer to a valid state following a write operation; and
wherein the block status information sent by the first side-channel interface further identifies a valid data block of an egress buffer of the shared memory device, and wherein the first side-channel interface is further configured to receive from the first DMA engine, a read status update signal for the egress buffer to update a state of the valid data block of the egress buffer to an empty state following a read operation;
wherein the block status tracking logic is further configured to update data block states indicated in the block status information of the egress buffer in response to the write status update signal for the egress buffer and the read status update signal for the egress buffer.

12. The data flow control device of claim 10, further comprising:
buffer size control logic to dynamically control a size of the ingress buffer.

13. The data flow control device of claim 10, wherein the ingress buffer comprises a ring buffer, and wherein the block status information of the ingress buffer comprises a write pointer circularly incremented after each write operation and a read pointer circularly incremented after each read operation, wherein the first DMA engine is configured to write to the ingress buffer based on the write pointer, and wherein the second DMA engine is configured to read from the ingress buffer based on the read pointer.

14. The data flow control device of claim 10, wherein the block status information of the ingress buffer comprises a bit vector with each bit indicating a state of a respective block of the ingress buffer.

15. The data flow control device of claim 10, wherein the block status tracking logic receives the write status update signal from the first DMA engine and the read status update signal from the second DMA engine independently of each other in response to asynchronous write and read operations.

16. The data flow control device of claim 10, wherein the block status tracking logic receives the write status update signal from the first DMA engine and the read status update signal from the second DMA engine at different update rates based on different throughputs of the first DMA engine and the second DMA engine.

17. A method for managing a block of an ingress buffer of a shared memory that facilitates data transfers in a direct memory access (DMA) system, the method comprising:
sending over a first side-channel interface to a first direct memory access (DMA) engine, block status information identifying an empty data block of an ingress buffer of a shared memory device;
receiving from the first DMA engine following a write operation, a write status update signal for the empty data block of the ingress buffer;
updating a state of the empty data block of the ingress buffer to a valid state in response to the write status update signal for the ingress buffer;
sending over a second side-channel interface to a second DMA engine, block status information identifying a valid data block of the ingress buffer;
receiving from the second DMA engine following a read operation, a read status update signal for the valid data block of the ingress buffer; and
updating a state of the valid data block of the ingress buffer to an empty state in response to the read status update signal for the ingress buffer.

18. The method of claim 17, further comprising:
sending over the second side-channel interface to the second DMA engine, block status information identifying an empty data block of an egress buffer of the shared memory device;
receiving from the second DMA engine following a write operation, a write status update signal for the empty data block of the egress buffer;
updating a state of the empty data block of the egress buffer to a valid state in response to the write status update signal for the egress buffer;
sending over the first side-channel interface to the first DMA engine, block status information identifying a valid data block of the egress buffer;
receiving from the first DMA engine following a read operation, a read status update signal for the valid data block of the egress buffer; and updating a state of the valid data block of the egress buffer to an empty state in response to the read status update signal for the egress buffer.

19. The method of claim 17, wherein the ingress buffer comprises a ring buffer, and wherein updating the state of the empty data block in response to the write status update signal comprises incrementing a write pointer associated with the ring buffer, and wherein updating the state of the valid data block in response to the read status update signal comprises incrementing a read pointer associated with the ring buffer.

20. The method of claim 17, wherein updating the state of the empty data block in response to the write status update signal comprises updating a bit of a bit vector associated with empty data block to indicate a change in state of the empty data block from an empty state to a valid state, and wherein updating the state of the valid data block in response to the read status update signal comprises updating a bit of a bit vector associated with the valid data block to indicate a change in state of the valid data block from a valid state to an empty state.

* * * * *